Patented July 5, 1932

1,865,770

UNITED STATES PATENT OFFICE

ALFRED T. LARSON, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

PROCESS OF PRODUCING HYDROGEN

No Drawing. Application filed July 21, 1927. Serial No. 207,574.

This invention relates to the manufacture of hydrogen by the catalysis of mixtures of steam and carbon monoxide.

It is known that hydrogen may be produced by the catalytic reaction of steam and carbon monoxide. Various catalysts have been recommended for use in this connection including the metals of the iron group, i. e. iron, nickel and cobalt, of which iron in particular has been widely employed in commercial operations.

In the manufacture of hydrogen, as in other catalytic processes, it is desirable that the catalyst be as active as possible, for with increased catalytic activity the size of the reaction apparatus may be reduced and the efficiency of the process as to yield of product may be increased.

It is the object of the present invention to provide an improved process for manufacturing hydrogen by the catalytic reaction of steam and carbon monoxide, the process being based upon the employment of catalysts of improved activity whose use results in great economies in operation.

Other objects and advantages will be apparent as the invention is better understood by reference to the following specification in which its details and preferred embodiments are described.

Broadly speaking fused oxides of the iron group metals cannot be considered as more active in the steam conversion of carbon monoxide than catalysts prepared by precipitation. Specifically, fused iron oxide is much inferior to the precipitated oxide, fused nickel oxide is slightly better than the precipitated material, and cobalt oxide, as compared with the other two metals, occupies an intermediate position. I have found, however, that the activity of an iron group metal oxide as a catalyst for the production of hydrogen from carbon monoxide and steam may be greatly improved by incorporating with an iron group metal oxide a metallic oxide, for example, copper oxide or antimony oxide, reducible to the metal under the conditions of the hydrogen-making operation, and fusing the mixture. The material thus prepared, after suitable reduction treatment, shows an improved activity as a catalyst for the conversion of carbon monoxide and steam and under normal conditions remains active for a long time. Its behavior as a catalyst is superior not only to that of fused iron group metal oxide alone but also to that of a mixture of iron group metal and copper or antimony oxide prepared without fusion. Such an improvement in the activity of iron group metal oxide catalysts could not have been predicted from the prior art; in fact one would be led away from the use of catalysts of the type herein described by the published statement (Evans and Newton, Industrial and Engineering Chemistry, 18, 513, (1926)) that fused oxides in general have low catalytic activity and that combinations such as iron and copper oxides are poorer catalysts than iron oxide alone.

Not only do the catalysts prepared by the method of the invention exhibit an improved activity but their great ruggedness and resistance to abrasion makes possible a substantial saving in catalyst cost; for, whereas with the usual iron group catalyst gradual disintegration thereof, while being charged into the reaction apparatus and while in use, results in sizable losses of catalysts, the catalysts herein described may be handled without any special precautions against disintegration and may be used practically indefinitely without loss through crumbling, etc.

Although the specific details of procedure used in preparing the catalysts and in employing the same in the manufacture of hydrogen may be varied within a wide range, the following examples will serve to illustrate the preferred method of practicing the invention:

*Example 1.*—Fifty parts by weight of pure cupric oxide and fifty parts of pure ferroso ferric oxide are ground together to form an intimate mixture which is then melted under an oxy-acetylene flame or an electric arc. The mass is allowed to cool and is then crushed and screened to obtain particles of suitable size. The catalyst granules are placed in the apparatus in which the conversion of carbon monoxide is to be effected. This apparatus may consist of a quartz tube provided with means for controlling the temperature thereof. The catalyst, disposed in this tube, is then reduced by slowly passing a current of pure hydrogen over it at 200° to 400° C. After the reduction the temperature of the catalyst is raised to about 450° C. and a mixture of two volumes of steam and one volume of carbon monoxide free from sulfur compounds is passed over it at 450° to 500° C. The gaseous mixture issuing from the apparatus consists of hydrogen and carbon dioxide in about equal proportions together with some unconverted carbon monoxide and steam. Pure hydrogen may be obtained therefrom by condensing the steam and subjecting the mixture to the usual processes for removing carbon dioxide and carbon monoxide.

In carrying out the reduction of the catalyst the hydrogen-containing products of a previous contact conversion operation may be employed or the catalyst may be reduced in situ by means of a portion of the mixture of steam and carbon monoxide subsequently to be employed in the manufacture of hydrogen.

*Example 2.*—A nickel-copper catalyst may be prepared and used in the same manner employing ten parts of pure nickelous oxide and ninety parts of pure cupric oxide.

*Example 3.*—A cobalt-copper catalyst may also be prepared, using twenty-five parts of pure cobaltous oxide and seventy-five parts of pure cupric oxide.

In the foregoing examples equal parts of antimony oxide may be substituted for copper oxide.

If desired two or more of the metals of the iron group may be used in conjunction with copper and also other substances may in some cases be added to the catalyst materials to impart desirable properties thereto. The use of the catalysts is not restricted to processes employing undiluted carbon monoxide, for the presence of other gases, such as carbon dioxide, nitrogen and methane, is permissible; it being remembered that when present these gases by their diluting effect will influence to some extent the efficiency of the conversion. In any event the gases used are preferably submitted to a preliminary purification for the purpose of removing substances that may damage the catalyst, particularly compounds of sulfur.

The production of hydrogen may advantageously be carried out under a pressure higher than atmospheric, say five to thirty atmospheres. When employing pressure the size of the apparatus and the amount of catalyst required may be reduced and considerable saving may be effected through improved heat exchange, where the heat contained in the gaseous products is used to warm the gases going to the reaction.

I have no explanation or theory to offer as to changes that may occur in the catalysts herein described, either during their preparation or actual use. The term catalyst as employed in the claims includes the contact mass in the form in which it is originally prepared as well as in any modified form in which it may occur during its use.

Various changes may be made in the method herein described without departing from the invention or sacrificing any of the advantages thereof.

I claim:—

1. The process of manufacturing hydrogen which comprises subjecting a mixture of steam and carbon monoxide to the action of a catalyst consisting of the reduction product of a fused mixture of an oxide of a metal of the iron group and copper oxide.

2. The process of manufacturing hydrogen which comprises subjecting a mixture of steam and carbon monoxide to the action of a catalyst consisting of the reduction product of a fused mixture of iron oxide and copper oxide.

3. A catalyst for the manufacture of hydrogen by the reaction of steam and carbon monoxide comprising the reduction product of a fused mixture of an oxide of a metal of the iron group and copper oxide.

4. A catalyst for the manufacture of hydrogen by the reaction of steam and carbon monoxide comprising the reduction product of a fused mixture of iron oxide and copper oxide.

5. The method of preparing an iron oxide catalyst for the production of hydrogen by the reaction of steam and carbon monoxide which comprises fusing a mixture of iron oxide and copper oxide and subjecting it to the action of a reducing agent at a temperature favorable to the reduction of the copper oxide.

In testimony whereof I affix my signature.

ALFRED T. LARSON.